(12) United States Patent
Chen et al.

(10) Patent No.: US 11,587,582 B2
(45) Date of Patent: Feb. 21, 2023

(54) READER NOISE REDUCTION USING SPIN HALL EFFECTS

(71) Applicant: Headway Technologies, Inc., Milpitas, CA (US)

(72) Inventors: Wenyu Chen, San Jose, CA (US); Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 17/552,450

(22) Filed: Dec. 16, 2021

(65) Prior Publication Data
US 2022/0108716 A1   Apr. 7, 2022

Related U.S. Application Data

(62) Division of application No. 16/546,397, filed on Aug. 21, 2019, now Pat. No. 11,205,447.

(51) Int. Cl.
*G11B 5/39* (2006.01)
*G11B 5/37* (2006.01)

(52) U.S. Cl.
CPC ............. *G11B 5/3909* (2013.01); *G11B 5/37* (2013.01); *G11B 5/398* (2013.01); *G11B 5/3932* (2013.01); *G11B 5/3945* (2013.01)

(58) Field of Classification Search
None
See application file for complete search history.

(56) References Cited

U.S. PATENT DOCUMENTS

| | | |
|---|---|---|
| 5,729,410 A | 3/1998 | Fontana, Jr. et al. |
| 5,862,022 A | 1/1999 | Noguchi et al. |
| 5,898,547 A | 4/1999 | Fontana, Jr. et al. |
| 5,901,018 A | 5/1999 | Fontana, Jr. et al. |

(Continued)

FOREIGN PATENT DOCUMENTS

| | | |
|---|---|---|
| JP | 2002-133610 | 5/2002 |
| JP | 2002-298309 | 10/2002 |

(Continued)

OTHER PUBLICATIONS

"Spin-Torque Ferromagnetic Resonance Induced by the Spin Hall Effect," by Luqiao Liu et al, Physical Review Letters, PRL 106, 036601 (2011), Jan. 21, 2011, pp. 1-4.

(Continued)

*Primary Examiner* — Craig A. Renner
(74) *Attorney, Agent, or Firm* — Saile Ackerman LLC; Stephen B. Ackerman

(57) ABSTRACT

A read head is disclosed wherein a Spin Hall Effect (SHE) layer is formed on a free layer (FL) in a sensor and between the FL and top shield (S2). Preferably, the sensor has a seed layer, an AP2 reference layer, antiferromagnetic coupling layer, AP1 reference layer, and a tunnel barrier sequentially formed on a bottom shield (S1). In a three terminal configuration, a first current flows between S1 and S2 such that the AP1 reference layer produces a first spin torque on the FL, and a second current flows across the SHE layer thereby generating a second spin torque on the FL that opposes the first spin torque. When the stripe heights of the FL and SHE layer are equal, a two terminal configuration is employed where a current flows between one side of the SHE layer to a center portion thereof and then to S1, or vice versa.

11 Claims, 11 Drawing Sheets

(56) References Cited

U.S. PATENT DOCUMENTS

| | | |
|---|---|---|
| 5,966,012 A | 10/1999 | Parkin |
| 6,023,395 A | 2/2000 | Dill et al. |
| 6,185,079 B1 | 2/2001 | Gill |
| 6,330,137 B1 | 12/2001 | Knapp et al. |
| 6,741,433 B1 | 5/2004 | Nishioka |
| 6,785,092 B2 | 8/2004 | Covington et al. |
| 6,788,502 B1 | 9/2004 | Gill |
| 6,809,899 B1 | 10/2004 | Chen et al. |
| 6,954,340 B2 | 10/2005 | Shukh et al. |
| 7,009,812 B2 | 3/2006 | Hsu et al. |
| 7,589,600 B2 | 9/2009 | Dimitriv et al. |
| 7,724,469 B2 | 5/2010 | Gao et al. |
| 7,835,111 B2 | 11/2010 | Flint et al. |
| 7,952,839 B2 | 5/2011 | Yamazaki et al. |
| 7,957,098 B2 | 6/2011 | Yamada et al. |
| 7,963,024 B2 | 6/2011 | Neuhaus |
| 7,978,442 B2 | 7/2011 | Zhang et al. |
| 7,982,996 B2 | 7/2011 | Smith et al. |
| 8,027,110 B1 | 9/2011 | Yamanaka et al. |
| 8,064,244 B2 | 11/2011 | Zhang et al. |
| 8,068,312 B2 | 11/2011 | Jiang et al. |
| 8,154,825 B2 | 4/2012 | Takashita et al. |
| 8,203,389 B1 | 6/2012 | Zhou et al. |
| 8,264,792 B2 | 9/2012 | Bai et al. |
| 8,270,112 B2 | 9/2012 | Funayama et al. |
| 8,295,008 B1 | 10/2012 | Sasaki et al. |
| 8,310,787 B1 | 11/2012 | Sasaki et al. |
| 8,320,079 B2 | 11/2012 | Iwaski et al. |
| 8,427,781 B1 | 4/2013 | Sasaki et al. |
| 8,446,690 B2 | 5/2013 | Alex et al. |
| 8,462,461 B2 | 6/2013 | Braganca et al. |
| 8,477,452 B2 | 7/2013 | Sasaki et al. |
| 8,493,687 B2 | 7/2013 | Sasaki et al. |
| 8,582,240 B1 | 11/2013 | Chen et al. |
| 8,582,241 B1 | 11/2013 | Yu et al. |
| 8,582,249 B2 | 11/2013 | Sapozhnikov et al. |
| 8,604,886 B2 | 12/2013 | Nikonov et al. |
| 8,634,163 B2 | 1/2014 | Tanabe et al. |
| 8,749,919 B2 | 6/2014 | Sasaki et al. |
| 8,767,347 B1 | 7/2014 | Sasaki et al. |
| 8,792,210 B2 | 7/2014 | de la Fuente et al. |
| 9,142,228 B2 | 9/2015 | Fujita et al. |
| 9,196,271 B1 | 11/2015 | Shirotori et al. |
| 9,230,571 B1 | 1/2016 | Chen et al. |
| 9,299,367 B1 | 3/2016 | Tang et al. |
| 9,337,414 B2 | 5/2016 | Li et al. |
| 9,361,912 B1 | 6/2016 | Liu et al. |
| 9,406,317 B1 | 8/2016 | Tang et al. |
| 9,437,225 B2 | 9/2016 | Quan et al. |
| 9,466,319 B1 | 10/2016 | Tang et al. |
| 9,824,701 B2 | 11/2017 | Tang et al. |
| 9,934,797 B2 | 4/2018 | Takahashi et al. |
| 9,966,091 B2 | 5/2018 | Chen et al. |
| 10,032,469 B2 | 7/2018 | Lim et al. |
| 10,037,772 B2 | 7/2018 | Okamura et al. |
| 10,079,057 B2 | 9/2018 | Ozbay et al. |
| 10,141,037 B2 | 11/2018 | Ohsawa et al. |
| 10,181,334 B1 | 1/2019 | Song et al. |
| 10,333,058 B2 | 6/2019 | Aradhya et al. |
| 10,333,523 B2 | 6/2019 | Manipatruni et al. |
| 10,559,318 B1 | 2/2020 | Chen et al. |
| 11,205,447 B2 | 12/2021 | Chen et al. |
| 2002/0034043 A1 | 3/2002 | Okada et al. |
| 2004/0057162 A1 | 3/2004 | Gill |
| 2004/0150910 A1 | 8/2004 | Okada et al. |
| 2005/0128637 A1 | 6/2005 | Johnston et al. |
| 2005/0141137 A1 | 6/2005 | Okada et al. |
| 2006/0044682 A1 | 3/2006 | Le et al. |
| 2006/0087765 A1 | 4/2006 | Iwakura et al. |
| 2006/0103978 A1 | 5/2006 | Takano et al. |
| 2007/0177301 A1 | 8/2007 | Han et al. |
| 2008/0013209 A1 | 1/2008 | Sasaki et al. |
| 2008/0088972 A1 | 4/2008 | Sasaki et al. |
| 2009/0059426 A1 | 3/2009 | Sasaki et al. |
| 2009/0080106 A1 | 3/2009 | Shimizu et al. |
| 2009/0128953 A1 | 5/2009 | Jiang et al. |
| 2009/0296275 A1 | 12/2009 | Sasaki et al. |
| 2010/0165517 A1 | 7/2010 | Araki et al. |
| 2011/0211271 A1 | 9/2011 | Ng et al. |
| 2012/0292723 A1 | 11/2012 | Luo et al. |
| 2013/0027032 A1 | 1/2013 | Gao et al. |
| 2014/0071562 A1 | 3/2014 | Chen et al. |
| 2014/0177092 A1 | 6/2014 | Katada et al. |
| 2015/0043106 A1 | 2/2015 | Yamada et al. |
| 2016/0218728 A1 | 7/2016 | Zhu |
| 2017/0133044 A1 | 5/2017 | Lim et al. |
| 2018/0075868 A1 | 3/2018 | Koui et al. |

FOREIGN PATENT DOCUMENTS

| | | |
|---|---|---|
| JP | 2008-021398 | 1/2008 |
| JP | 2010-157303 | 7/2010 |

OTHER PUBLICATIONS

"Surface-Assisted Spin Hall Effect in Au Films with Pt Impurities," by B. Gu et al., Physical Review Letters, PRL 105, 216401 (2010), Nov. 19, 2010, pp. 1-4.

U.S. Office Action, U.S. Appl. No. 16/546,397, Applicant: Chen et al., dated May 11, 2021, 7 pages.

U.S. Office Action, U.S. Appl. No. 16/546,397, Applicant: Chen et al., dated Feb. 5, 2021, 17 pages.

U.S. Office Action, U.S. Appl. No. 16/546,397, Applicant: Chen et al., dated Aug. 11, 2020, 18 pages.

U.S. Notice of Allowance, U.S. Appl. No. 16/546,397, Applicant: Chen et al., dated Aug. 23, 2021, 8 pages.

U.S. Notice of Allowance, U.S. Appl. No. 14/445,167, Applicant: Quan et al., dated May 4, 2016, 8 pages.

U.S. Notice of Allowance, U.S. Appl. No. 16/370,613, Applicant: Chen et al., dated Oct. 22, 2019, 16 pages.

PTO Office Action, U.S. Appl. No. 12/964,202, Applicant: Sasaki et al., dated Nov. 28, 2012, 11 pages.

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation.

Nov. 13, 2012, Office Action Issued in Japanese Patent Application No. 2011-149243, with English language translation.

Nov. 13, 2012, Office Action issued in Japanese Patent Application No. 2011-149244, with English language translation.

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

"Spin-Torque Switching with the Giant Spin Hall Effect of Tantalum," by Luqiao Liu et al., Science May 4, 2012: vol. 336, Issue 6081, pp. 555-558, DOI: 10.1126/science.1218197.

D'Yakanov, M. I., Spin Hall Effect. Int. J. Mod. Phys. B 23, 2556-2565 (2009).

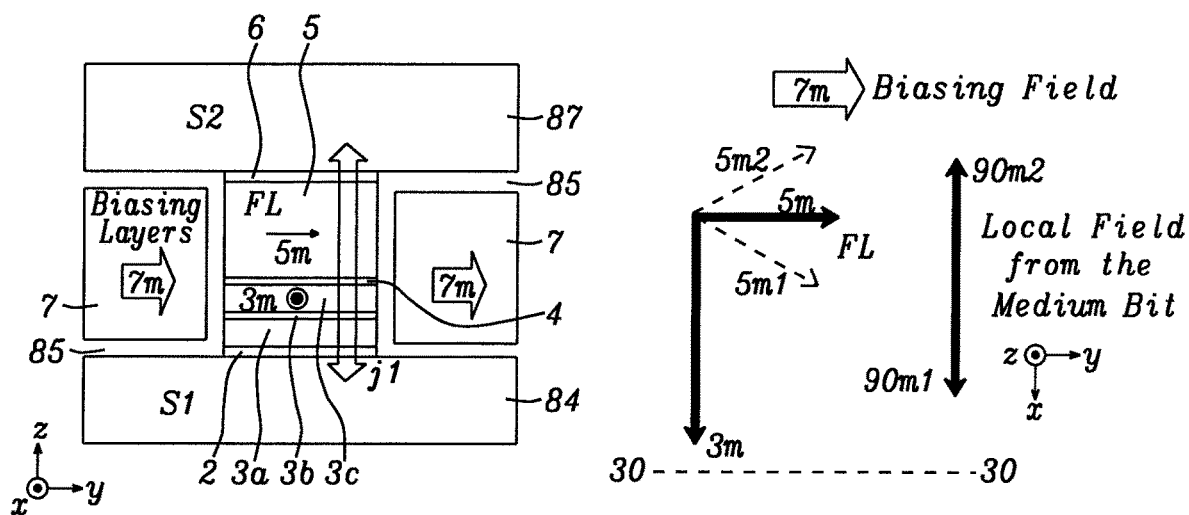
FIG. 1A
Prior Art
FIG. 1B
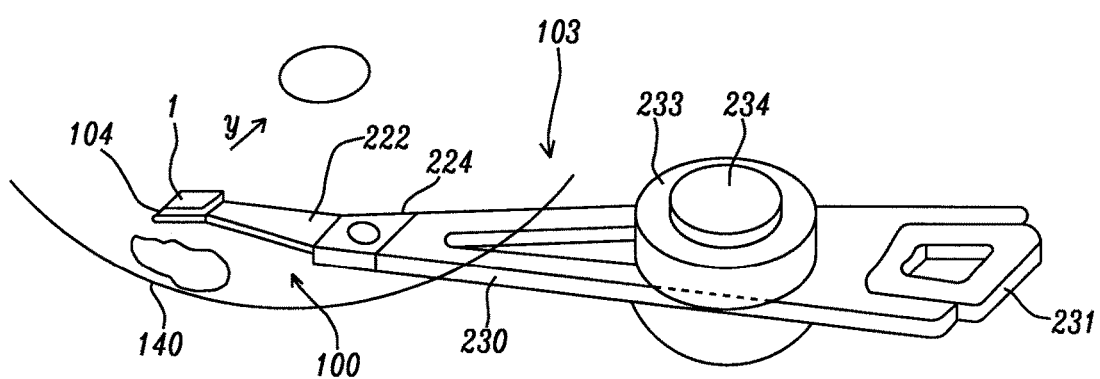
FIG. 2

READER NOISE REDUCTION USING SPIN HALL EFFECTS

This is a divisional application of U.S. patent application Ser. No. 16/546,397; filed on Aug. 21, 2019, which is herein incorporated by reference in its entirety, and assigned to a common assignee.

RELATED PATENT APPLICATIONS

This application is related to the following: U.S. Pat. Nos. 9,437,225; and 10,559,318; assigned to a common assignee, and herein incorporated by reference in their entirety.

TECHNICAL FIELD

The present disclosure relates to a reader structure wherein a Spin Hall Effect (SHE) layer comprised of a giant positive or negative Spin Hall Angle (SHA) material is formed between a free layer (FL) in a sensor and a top shield (S2), and wherein the reader is configured in a two terminal design where a read current is applied between a bottom shield (S1) and one end of the SHE layer, or in a three terminal design where a current is applied between S1 and S2 while a second current ($I_{SHE}$) is applied across the SHE layer in a longitudinal direction and a portion of the current splits off and flows through the sensor to S1 so that spin torque from the SHE layer opposes spin torque from a reference layer on the FL thereby substantially reducing spin torque noise in the FL, and increasing the sensor signal-to-noise ratio (SNR) and improving the bit error rate (BER) in recording to enable smaller sensor sizes and greater areal density capability (ADC).

BACKGROUND

The hard disk drive (HDD) industry requires the magnetoresistive (MR) sensor in a read head of a combined read-write head to have a smaller size for better ADC. For current tunneling MR (TMR) sensors that typically have a sensor resistance of around 300-600 Ohms, a reduction of the tunnel barrier RA (product of the resistance and area) is necessary to keep the same sensor resistance as the lateral size decreases. However, an undesirable consequence of lower tunnel barrier RA is spin torque induced magnetic noise in sensors.

Spin transfer torque (hereinafter referred to as spin torque) arises from the spin dependent electron transport properties of ferromagnetic-spacer-ferromagnetic multilayers. When current passes through a magnetic multilayer in a CPP (current perpendicular to plane) configuration, the first ferromagnetic layer (FM1) that is a reference layer, for example, will generate spin polarized currents as the electrons traverse FM1. When the spin polarized current is transmitted through a polarization preservation spacer such as a tunnel barrier, the spin angular moment of electrons incident on a second FM layer (FM2) interacts with magnetic moments of FM2 (i.e. free layer) near the interface between FM2 and the non-magnetic spacer. Through this interaction, the electrons transfer a portion of their angular momentum to FM2. As a result, spin-polarized current can influence the magnetization direction of a FL, or induce its dynamics, if the current density in a read current between bottom and top shields (S1 and S2) in a sensor is sufficiently high.

FIG. 1A is a schematic depicting a typical read head sensor in HDD from an ABS perspective. A seed layer 2, AP2 reference layer 3a, antiferromagnetic coupling (AFC) layer 3b, AP1 reference layer 3c, non-magnetic spacer 4, free layer 5, and capping layer 6 are sequentially formed on S1 84 and form a sensor between S1 and S2 87. The AP1 layer has magnetization 3m in a transverse direction (orthogonal to the ABS) that is stabilized through AFC coupling with the AP2 layer. The free layer (FL) has magnetization 5m that is free to rotate in and out of the ABS, and is biased in a cross-track direction with a longitudinal field 7m from magnetic biasing layers 7 on each side of the FL. The AP2 layer is usually coupled to an antiferromagnetic (AFM) layer (not shown) that may be behind the sensor stack shown in FIG. 1A to reduce S1-S2 spacing. Read current j1 may be applied from S1 to S2 or in the reverse direction.

As shown in FIG. 1B from a top-down view, with a local magnetic field 90m1 or 90m2 from a magnetic medium bit (not shown) out of or into the ABS 30-30, respectively, FL magnetization 5m, which is in a longitudinal direction in the absence of a local field, rotates toward the ABS (5m1) or away from the ABS (5m2) under the influence of the local field. Accordingly, alignment between magnetization 5m1 and 3m is closer to the parallel state (P) with lower resistance, and alignment between magnetization 5m2 and 3m is closer to the anti-parallel state (AP) with higher resistance. For simplicity, the AP1 layer has a small canting angle (not shown) toward the longitudinal (y-axis) direction that is neglected. Spin torque noise in the sensor depends on the polarity of the current applied between S1 and S2. When positive current flows from S2 to S1, electrons with negative charge are spin polarized by AP1 to the FL direction and interact with the FL through spin torque. As a result, spin torque attempts to stabilize the P state and destabilize the AP state. Therefore, when the local field 90m2 is into the ABS (upward x-axis direction) and results in FL magnetization 5m2, spin torque noise at power level A is observed. On the other hand, when current flows from S1 to S2, spin torque destabilizes the P state and stabilizes the AP state thereby causing higher spin torque noise at power level B when the local field 90m1 is out of the ABS 30-30 (downward x-axis direction) and results in FL magnetization 5m1. Power level A is typically higher than B since the magnitude of the spin torque per area of the FL is proportional to the voltage across the TMR barrier (non-magnetic spacer 4). Under a fixed current density, the AP state has a higher resistance, and thus a higher voltage drop and a higher spin torque noise is the result.

The magnitude of the spin torque per area of the FL is proportional to the voltage across the TMR barrier, and is anti-proportional to the RA of the barrier layer. Thus, for a sensor width >30 nm, RA is typically above 0.7 Ohm-$\mu m^2$ where spin torque noise is not considered an important factor and where current polarity does not make a significant difference in noise level. For sensor widths in the range of 25-30 nm, RA around 0.6 Ohm-$\mu m^2$ is needed, and restricting the current polarity to only the preferred direction as described previously can limit the noise level to an acceptable magnitude for power level A. However, when sensor widths below 25 nm, and RA below 0.6 Ohm-$\mu m^2$ or even below 0.5 Ohm-$\mu m^2$ are required, then spin torque noise increases to a level that is an important concern for SNR even under the preferred current polarity. Thus, a new reader design is necessary to reduce spin torque noise, especially for reader sensors having a width <25 nm and RA below 0.6 Ohm-$\mu m^2$ that are critical features in advanced HDD products.

SUMMARY

One objective of the present disclosure is to provide a reader design where the spin torque noise between an AP1 layer and FL in a sensor is effectively canceled to provide better SNR and enable higher ADC, especially for sensor widths <25 nm.

A second objective of the present disclosure is to provide various embodiments of the reader design according to the first objective that allow for smaller shield to shield spacing, or for greater simplicity in the fabrication process.

A third objective of the present disclosure is to provide a process flow for forming a sensor that satisfies the first two objectives.

According to a first embodiment of the present disclosure, these objectives are achieved by forming a SHE layer between a FL in a sensor and a top shield (S2) in the reader. The SHE layer may be made of a positive giant SHA material such as Pt or a negative giant SHA material such as β-Ta, and has a front side at the ABS in some embodiments, or is recessed behind a portion of S2 in other embodiments to reduce shield to shield spacing (RSS). In another embodiment, the SHE layer replaces a front portion of S2 to minimize RSS. Preferably, the SHE layer is comprised of a so-called giant SHA material having an absolute value for SHA that is >0.05, and is separated from S2 by an insulation layer. In one preferred embodiment, the sensor stack has a seed layer, a reference layer with an AP2/AF coupling/AP1 configuration, tunnel barrier, FL, and SHE layer sequentially formed on the bottom shield (S1).

The reader may be configured as a three terminal device where a current having a first current density is applied from one side of the SHE layer and exits an opposite side with a lower current density since a portion of the input current is split off and flows through the sensor to S1. When the current with the first current density j is injected into the SHE layer and the portion that is split off with current density j1 flows to S1, and spin polarization from the AP1 layer to the FL is P0, and AP1 magnetization is aligned out of the ABS, then the spin current at density (j1×P0) with spin direction out of the ABS is injected into the FL that causes FL magnetic noise. To offset the aforementioned noise, the SHE layer produces spin current with spin torque on the FL. For a (+) SHA material and a j2 direction from left to right at the ABS, the spin torque from the SHE layer will cancel the aforementioned FL magnetic noise when (j2×SHA)=(j1×P0) where SHA is the spin polarization of the SHA material to the FL. If a (-) SHA material is used, then the j2 direction is from right to left when j1 is from the SHE layer to S1. Alternatively, when j1 is from S1 to the SHE layer, then the direction of j2 in each of the aforementioned SHE layers made of (+) and (-) SHA material is reversed.

In embodiments where the stripe height (SH) of the SHE layer is proximate to that of the FL, then the current density for j1 and j2 is substantially the same and the reader may be configured as a two terminal device to simplify the circuit and processing steps. In particular, one end of the SHE layer used in the three terminal device described previously may be etched away, or remain in place but with no connection to a lead. For example, with a (+) SHA material, a current is directed from the left side of the SHE layer to a center portion and then proceeds down through the sensor stack to S1, or the direction of the current may be reversed so that spin torque from the SHE layer and AP1 layer on the FL cancel one another. When a (-) SHA material is employed, the current direction is from the right side of the SHE layer to the center portion and then down through the sensor stack to S1, or in the reverse direction.

A process flow is provided for fabricating a sensor where an AFM layer is formed behind a front portion of S1 to reduce RSS. The SHE layer preferably has a full width between the sides thereof so that the SHE layer sides are coplanar with the sides of S1 and S2.

BRIEF DESCRIPTION OF THE DRAWINGS

FIG. 1A is a schematic view of a reader structure wherein a sensor stack is formed between two shields (S1 and S2), and biasing layers are placed on each side of the sensor stack to bias the FL magnetization.

FIG. 1B is a top-down view of the AP1 layer and FL magnetizations in FIG. 1A, and shows how a local field from a medium bit influences the FL magnetization to move toward or away from the air bearing surface (ABS).

FIG. 2 is a perspective view of a head arm assembly of the present disclosure.

DETAILED DESCRIPTION

Figure 3:
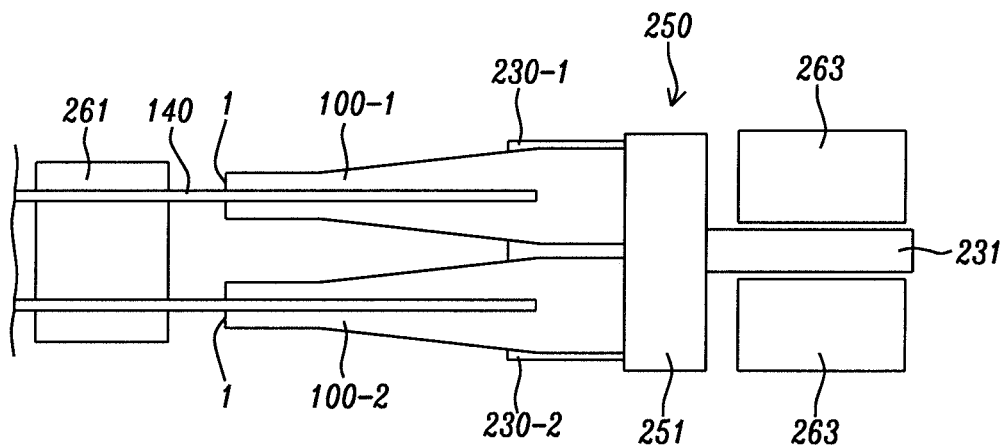
FIG. 3 is side view of a head stack assembly of the present disclosure.

The present disclosure is a reader comprised of a sensor and that is in a combined read-write head wherein a SHE layer is formed between a free layer (FL) in the sensor and a top shield (S2) so that when a current is applied across the SHE layer in a cross-track direction, and a portion or all of the current flows in a down-track direction through the sensor in a three terminal or two terminal configuration, respectively, spin torque from the SHE layer offsets spin torque from a reference layer on the FL to substantially reduce magnetic noise in the FL thereby reducing the sensor SNR and improving BER. In the drawings, the y-axis is in a cross-track direction, the z-axis is in a down-track direction, and the x-axis is in a direction orthogonal to the ABS and towards a back end of the writer structure. Thickness refers to a down-track distance, width is a cross-track distance, and height is a distance orthogonal to the ABS in the x-axis direction. A magnetization in a transverse direction is orthogonal to the ABS, while a longitudinal direction is the cross-track direction. A back end or backside refers to a side of a layer facing away from the ABS, and a front side is a side of a layer facing the ABS or at the ABS.

Referring to FIG. 2, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Next, a side view of a head stack assembly (FIG. 3) and a plan view of a magnetic recording apparatus (FIG. 4) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 2) of the voice coil motor is mounted at the opposite side of each arm in carriage 251. The voice coil motor has a permanent magnet 263 arranged at an opposite position across the coil 231.

Figure 4:
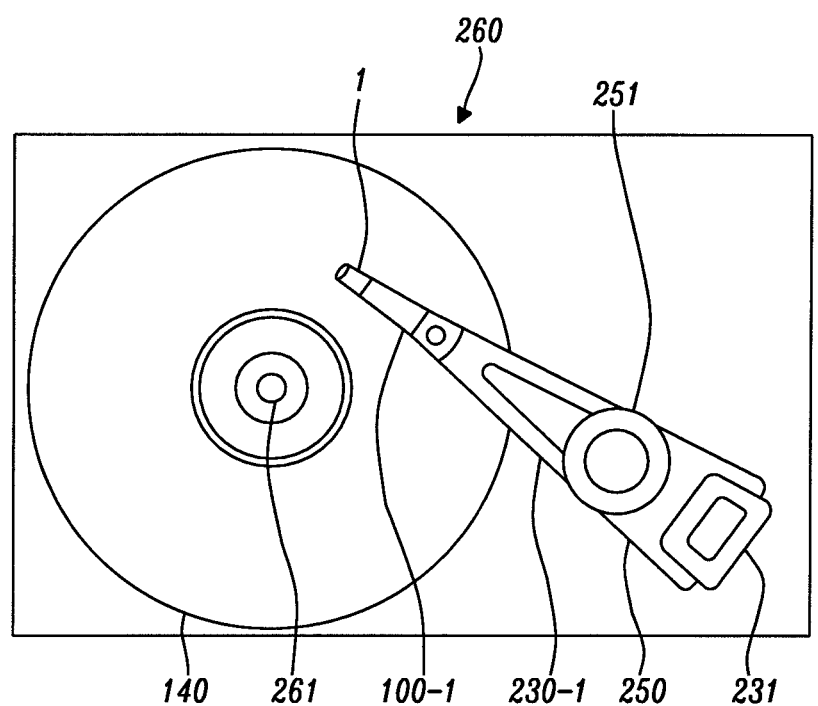
FIG. 4 is a plan view of a magnetic recording apparatus of the present disclosure.

With reference to FIG. 4, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 5:
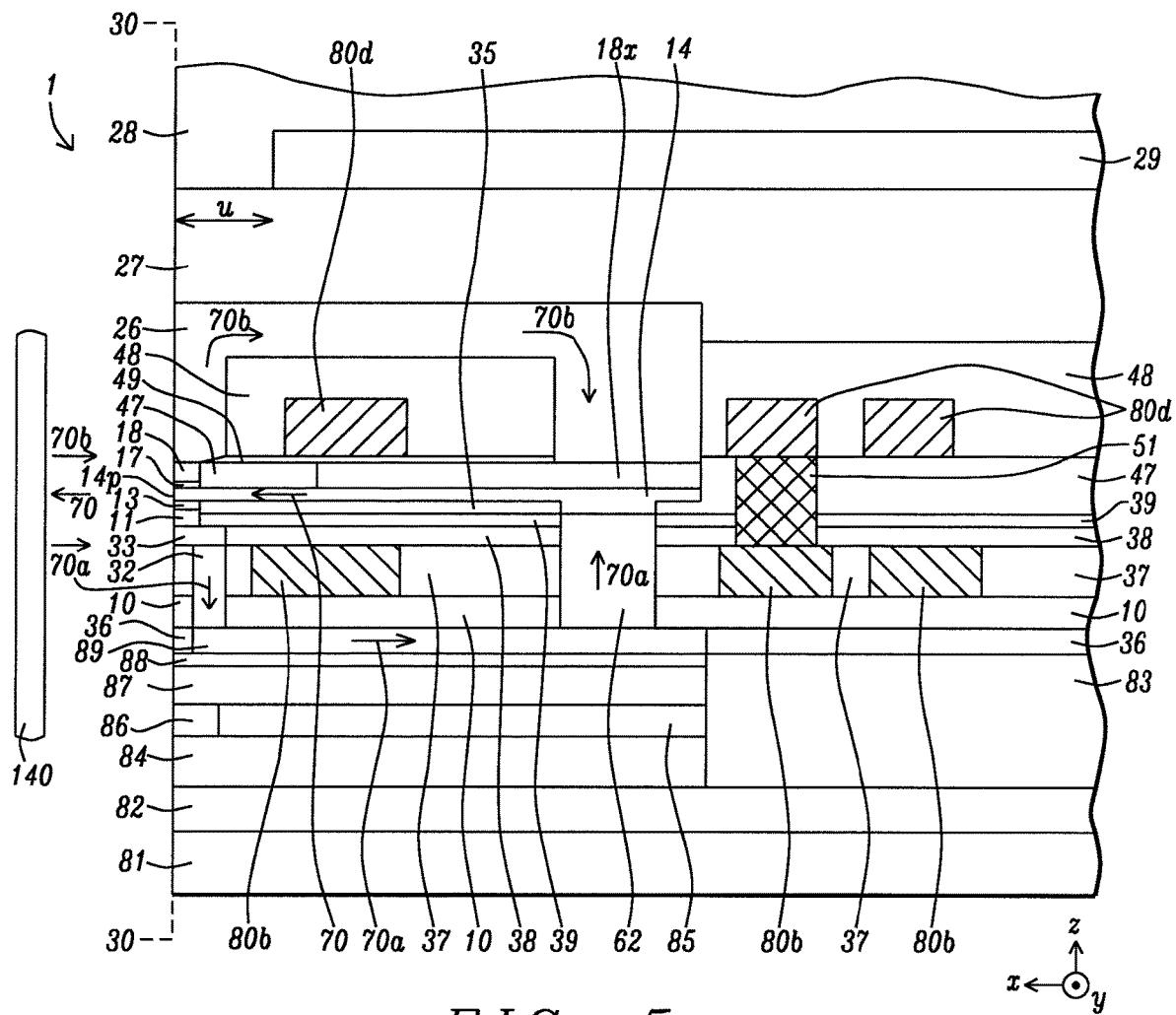
FIG. 5 is a down-track cross-sectional view of a combined read-write head with leading and trailing loop pathways for magnetic flux return to the main pole according to an embodiment of the present disclosure.

Referring to FIG. 5, magnetic recording head 1 comprises a combined read-write head. The down-track cross-sectional view is taken along a center plane (46-46 described later with respect to FIGS. 19-21) that is formed orthogonal to the ABS 30-30, and that bisects the main pole layer 14. The read head (reader) is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield (S1) 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a reference layer and a free layer where the FL has a magnetization (not shown) that rotates in the presence of a local magnetic field from a magnetic bit to a position that is substantially parallel or antiparallel to the reference layer magnetization as described previously with regard to FIG. 1B. Insulation layer 85 adjoins the backside of the MR sensor, and insulation layer 83 contacts the backsides of the bottom shield and top shield (S2) 87. The top shield is formed on the MR sensor. An insulation layer 88 and a top shield (S2B) layer 89 are sequentially formed on S2. Note that the S2B layer 89 may serve as a flux return path (RTP) in the write head portion of the combined read/write head. Thus, the portion of the combined read/write head structure formed below layer 89 in FIG. 5 is typically considered as the read head (reader). In other embodiments (not shown), the read head may have a dual reader design with two MR sensors, or a multiple reader design with multiple MR sensors.

The present disclosure anticipates that various configurations of a write head (writer) may be employed with the read head portion. The exemplary embodiment shows magnetic flux 70 in main pole (MP) layer 14 is generated with flowing a current (not shown) through bucking coil 80b and driving coil 80d that are below and above the main pole layer, respectively, and are connected by interconnect 51. Magnetic flux 70 exits the MP layer at MP pole tip 14p at the ABS 30-30 and is used to write a plurality of bits on magnetic medium 140. Magnetic flux 70b returns to the MP through a trailing loop comprised of trailing shield 17, write shield 18, PP3 shield 26, and top yoke 18x. There is also a leading return loop for magnetic flux 70a that includes leading shield 11, leading shield connector (LSC) 33, S2 connector (S2C) 32, return path 89, and back gap connection (BGC) 62. The magnetic core may also comprise a bottom yoke 35 below the MP layer. Dielectric layers 10, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is the uppermost layer in the writer.

In related U.S. Pat. No. 10,559,318, we disclosed the use of a SHE layer in a write head between a MP trailing side and the trailing shield. When a current ($I_{SHE}$) is conducted across the SHE layer during a write process and synchronized with the write current, spin transfer torque is generated on both of the MP trailing side and trailing shield to provide a boost in transition speed and transition sharpness, and improved BER. Now we have discovered that the spin torque generated by flowing a current through a SHE layer may be advantageously employed in reducing magnetic noise within a FL in a reader sensor.

Figure 6:
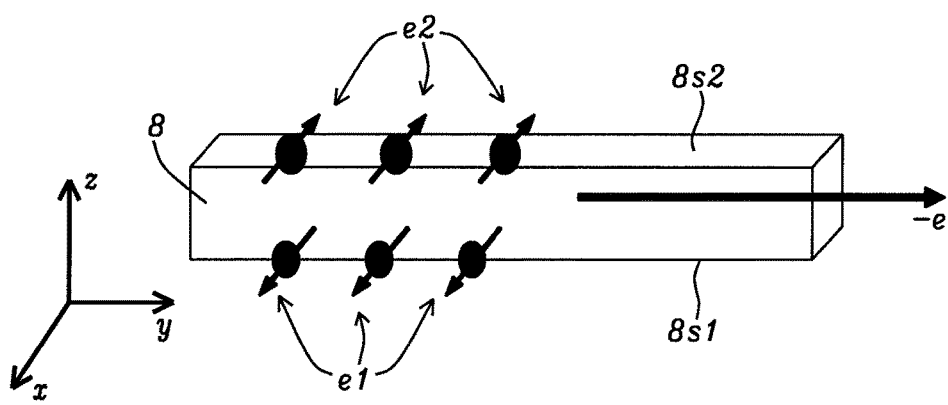
FIG. 6 is an oblique view of a conductor made of a SHA material where electrons with spin in the (-) x-axis direction are deflected to the (+) z-axis surface, and electrons with spin in the (+) x-axis direction are deflected to the (-) z-axis surface.

Spin Hall Effect (SHE) is a physics phenomenon discovered in the mid $20^{th}$ century, and is described by M. Dyaknov et al. in Physics Lett. A, Vol. 35, 459 (1971). Similar to a regular Hall Effect where conduction carriers with opposite charges are scattered to opposite directions perpendicular to the current density due to a certain scattering mechanism, SHE causes electrons with opposite spins to be scattered to opposite directions perpendicular to the charge current density as a result of strong spin-orbit coupling in the conducting layer. As shown in FIG. 6, electrons pass through a non-magnetic conductor 8 with strong spin orbit interaction, and electrons e2 with spin in the negative x-axis direction are deflected to the +z-axis surface 8s2 while electrons e1 with spin in the positive x-axis direction are deflected to the negative z-axis surface 8s1. SHE is quantified by the Spin Hall Angle (SHA) defined as the ratio of the spin current in the direction transverse to the charge current (z-axis in FIG. 6) to the charge current (y-axis direction in FIG. 6). For many years after SHE was discovered, the absolute value of SHA materials evaluated was typically <0.01, and SHE layers had very limited applications in industry.

During the past 10 years, materials with substantially larger (giant) SHA have been found. B. Gu et al. in Phys. Rev. Lett. 105, 216401 (2010), and L. Liu et al. in Phys. Rev. Lett. 106, 036601 (2011) provided examples of SHA~0.07 in a Pt layer, and as large as 0.12 in Au layers with Pt doping. A large but negative SHA of around −0.12 was found in β-Ta, meaning that electrons in the β-Ta layer are spin scattered in the opposite directions compared to what is shown in FIG. 6.

Figures 7A, 7B:
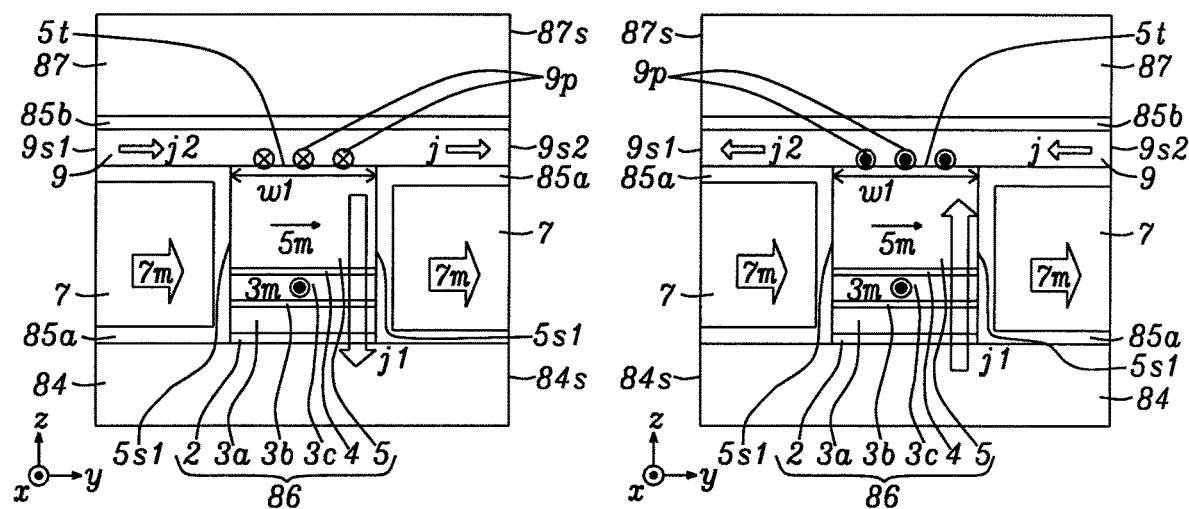
FIG. 7A is an ABS view of a reader sensor according to an embodiment of the present disclosure where a current is applied in a cross-track direction across a SHE layer made of a (+) SHA material and a portion of the current splits off and flows through the sensor to S1 to reduce spin torque noise within the free layer that is below the SHE layer.
FIG. 7B is an ABS view of the reader sensor in FIG. 7A showing that the current pathways may be reversed to minimize spin torque noise within the free layer.

Referring to FIG. 7A, an ABS view of the reader with MR sensor 86 in FIG. 5 is shown according to a first embodiment of the present disclosure where a single SHE layer 9 made of a positive giant SHA material contacts a top surface 5t of FL 5 in the sensor. The sensor is a stack of layers with sidewalls 5s1, and wherein seed layer 2, AP2 layer 3a, AF coupling layer 3b, AP1 layer 3c, non-magnetic layer 4, and FL 5 are sequentially formed on S1 84. The non-magnetic spacer is a tunnel barrier layer in preferred embodiments, but also may be a metal spacer in other embodiments. The MR sensor also typically comprises one or more additional layers including an AFM layer (not shown) behind the stack pictured in FIG. 7A, and described later. FL magnetization 5m is longitudinally biased with magnetization 7m in biasing layers 7 formed within an insulation layer 85a that contacts each sidewall 5s1 of the MR sensor. An upper portion of insulation layer 85a separates each biasing layer from SHE layer 9. Note that the SHE layer has a full width such that each side 9s1, 9s2 is coplanar with a side 84s of S1 and a side 87s of S2 87. Insulation layer 85b is formed on the SHE layer and electrically separates the SHE layer from S2. Insulation layers 85a, 85b are bottom and top portions, respectively, of insulation layer 85 shown in FIG. 5.

The benefit of the SHE layer 9 is explained as follows. Conduction electrons in the input current in the SHE layer (hereinafter referred to as $I_{in}$) that flows in a positive y-axis direction with current density j2 in the input direction at side 9s1, and current density j in the output direction at side 9s2, and that carry spin downward propagate to FL top surface 5t. This spin polarization 9p substantially offsets a similar spin polarization (not shown) that is generated when a portion of the input current j2 splits off and flows with current density j1 through sensor 86 to S1 84 and conduction electrons in j1 that carry spin upward from AP1 layer 3c produce spin torque on FL 5. In particular, spin current density represented by the product (j1×P0) where P0 is the spin polarization from AP1 to the FL is preferably proximate to the spin current density represented by the product (j2×SHA) where SHA is the spin polarization from the SHE layer to the FL. In the ideal case where (j1×P0)=(j2×SHA), or optionally, when (j1×P0) is proximate to (j2×SHA), then spin torque induced magnetic noise within the FL is minimized to essentially zero or reduced substantially and will enable smaller sensor widths w1 with a smaller RA product of <0.6 in the tunnel barrier 4 for optimum performance. Note that when sensor sidewalls 5s1 are non-vertical, width w1 refers to the FL width.

SHE layer thickness t is preferably less than 12 nm since the L. Liu reference mentioned earlier indicates that a SHE assist (spin torque applied to an adjacent magnetic layer, i.e. FL 5 in the present disclosure) is reduced when the giant SHA material has a thickness >12 nm. Preferably, the absolute value for SHA is >0.05, and more preferably is greater than 0.10 to enable a lower j2 current density. In some embodiments, the SHA material is a heavy metal that is one of β-Ta, Hf, Pt, Ir, and W that may be embedded with Au, for example. In other embodiments, a topological insulator (TI) may serve as a SHA material according to a report at phys.org/news/2017-11-significant-breakthrough-topological-insulator-based-devices.html. A TI may be one of $Bi_2Sb_3$, $Bi_2Se_3$, $Bi_2Te_3$, or $Sb_2Te_3$, and has an inner portion that is an insulator or a high resistance material while an outer portion comprising the surface thereof has a spin-polarized metal state. Therefore, the TI has an internal magnetic field such as a spin orbit interaction. A pure spin current can be generated in a highly efficient manner due to the strong spin orbit interaction and collapse of the rotational symmetry at the surface.

Seed layer 2 typically includes one or more metals such as Ta, Ti, Ru, and Mg, an alloy such as NiCr, or a nitride (TiN or TaN) that promote uniform thickness and the desired crystal growth in overlying MR sensor layers. Each of AP2 layer 3a, AP1 layer 3c, and FL 5 may be a single layer or multilayer comprised of one or both of Co and Fe that may be alloyed with one or more of Ni, B, and with one or more non-magnetic elements such as W, Mo, Ta, and Cr. AF coupling layer 3b is typically one of Ru, Rh, Ir, or Os and has a thickness that ensures AP2 layer 3a is AF coupled to AP1 layer 3c. A non-magnetic spacer 4 that is a tunnel barrier layer is preferably MgO but may be another metal oxide, metal oxynitride, or metal nitride used in the art. In other embodiments, the non-magnetic spacer is a metal such as Cu. Insulation layers 85a, 85b may be one or more of $Al_2O_3$, TaOx, SiN, AlN, $SiO_2$, MgO, and NiO. S1 84 and S2 87 typically extend from a front side at the ABS to a backside (not shown) that is 10 microns or more from the ABS, have a magnetization saturation (Ms) value from 5 kiloGauss (kG) to 15 kG, and are generally comprised of CoFe, CoFeNi, CoFeN, or NiFe, or a combination thereof. In some embodiments, each biasing layer 7 is a junction shield that is comprised of one or more magnetic materials such as CoFe and NiFe. However, the biasing layer may also be a hard magnetic material that is CoCrPt or CoCrPtX where X is B, O or other elements that can assist a perpendicular growth of the HB easy axis, TbFeCo, or a multilayer ferromagnetic/non-magnetic super-lattice structure that is $[Co/Pt/Co]_n$ or $[Co/Pd/Co]_n$, for example, where n is a lamination number.

As shown in FIG. 7B, the first embodiment also encompasses a MR sensor having the three terminal configuration shown in FIG. 7A except where j1 flows from S1 84 through sensor 86 to SHE layer 9, and merges with j that flows in the negative y-axis direction from the right side 9s2 of SHE layer 9 to give current density j2 in the output direction at the left side 9s1. In this case, SHE layer spin polarization 9p is in the opposite direction shown in FIG. 7A but still opposes spin polarization (not shown) from AP1 layer 3c on FL 5 because j1 is also reversed compared with the FIG. 7A configuration. As a result, the same advantageous result of reduced spin torque induced magnetic noise in the FL that enables a reduced SNR, lower tunnel barrier RA, and improved reader performance for a MR sensor width w1<25 nm, is realized as in FIG. 7A when the product (j1×P0) is proximate or equal to the product (j2×SHA).

Figure 8A:
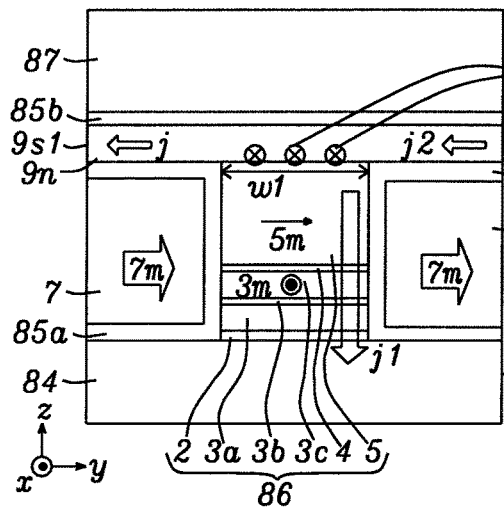
FIG. 8A is an ABS view of a reader sensor according to an embodiment of the present disclosure where a current is applied in a cross-track direction across a SHE layer made of a (-) SHA material and a portion of the current splits off and flows through the sensor to S1 to reduce spin torque noise within the free layer that is below the SHE layer.

Referring to FIG. 8A, all aspects of the embodiment in FIG. 7A are retained except the (+) SHE layer is replaced with a negative giant SHA material to give (−) SHE layer 9n. Therefore, j2 in SHE layer 9n is reversed compared with FIG. 7A and flows in the input direction from side 9s2 and splits into j1 that flows through sensor 86 to S1 84 and j in the output direction to side 9s1 in order to achieve the same effect where spin torque produced by spin polarization 9p from j2 essentially cancels spin torque caused by spin polarization (not shown) from AP1 layer 3c that is generated on FL 5. In other words, spin torque induced magnetic noise in the FL is effectively reduced to zero, or substantially decreased, to provide the same benefit mentioned previously for the FIG. 7A configuration when (j1×P0) is proximate or equal to (j2×SHA).

Figure 8B:
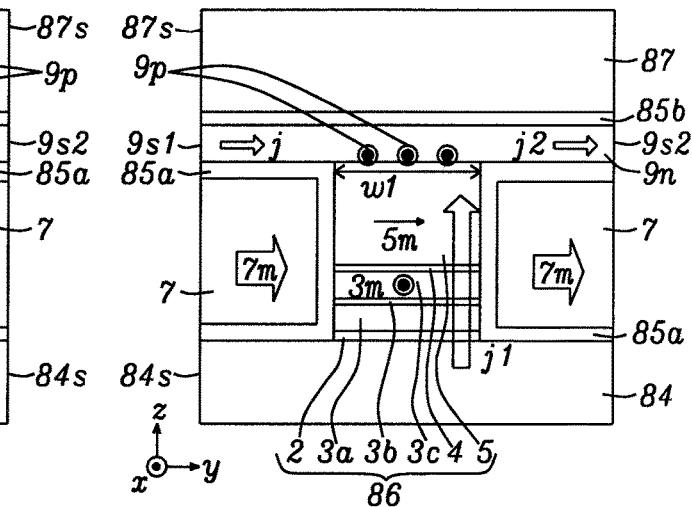
FIG. 8B is an ABS view of the reader sensor in FIG. 8A showing that current pathways may be reversed to minimize spin torque noise within the free layer.

FIG. 8B depicts an alternative configuration for the embodiment in FIG. 8A where all aspects are retained except the direction is reversed for j, j1, and j2. Thus, j1 flows from S1 84 through sensor 86 to SHE layer 9n, and merges with j that flows from side 9s1 to yield j2 that flows to side 9s2 in SHE layer 9n. Then the spin torque from the SHE layer essentially cancels the spin torque from AP1 layer 3c when (j1×P0) equals or is proximate to (j2×SHA) as explained earlier.

In a conventional reader with an RA of 0.5 Ohm-$\mu m^2$, a voltage of about 140 mV is generally applied across tunnel barrier 4. Thus, the resulting current density is j1=2.8×$10^7$ Amps/$cm^2$. Assuming the stripe height (SH2 in FIG. 12) is substantially larger than the FL stripe height (SH1 in FIG. 12), the amount of current that is input from SHE layer side 9s1 in FIG. 7A, for example, and split into the MR sensor current is negligible. Thus, the injected current density j2 from side 9s1 and output current density j at side 9s2 in FIG. 7A are equal. Spin polarization P0 from AP1 layer 3c to FL 5 is typically 0.4-0.6, and the SHA for a giant SHE layer 9 is in the range of 0.1-0.2. Accordingly, j2 should be a factor of 3-4 times j1 to satisfy the objective of (j1×P0)=(j2×SHA). It follows that the desired j2 of around 8-10×$10^7$ Amps/$cm^2$ is applicable in a SHE layer with good reliability. It should be understood that in embodiments where (j1×P0) is proximate to (j2×SHA), a significant decrease in spin torque induced magnetic noise within the FL is still achieved compared with the prior art where there is no SHE layer.

Figure 9:
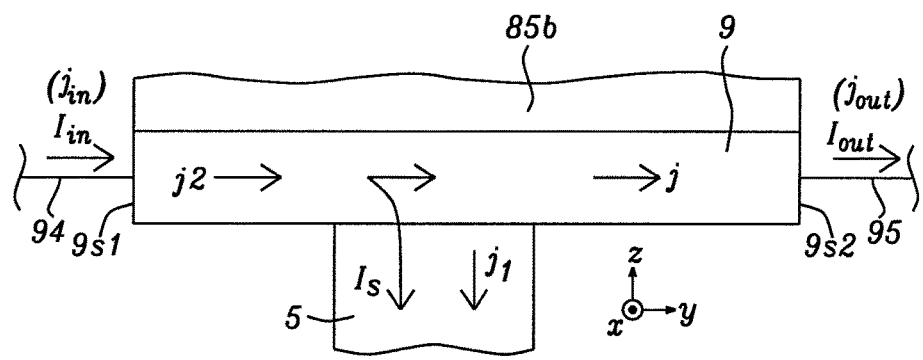
FIG. 9 is an ABS view showing input and output current for a SHE layer, and where a portion of input current with current density j2 is split out to the j1 pathway through the free layer and a j pathway to an opposite side of the SHE layer according to an embodiment of the present disclosure.
Figure 12:
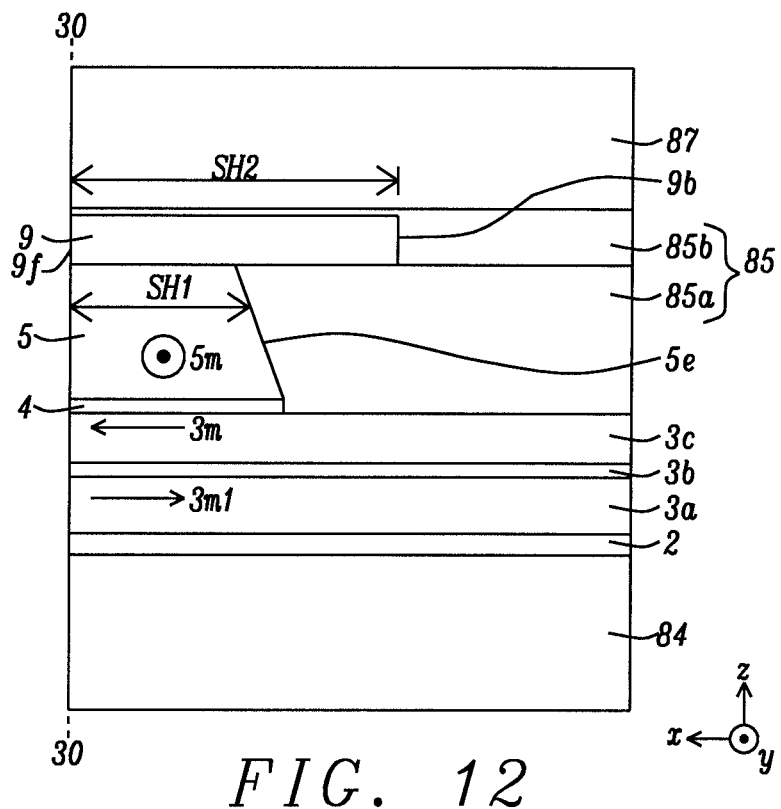
FIG. 12 is a down-track cross-sectional view of a reader sensor according to an embodiment of the present disclosure where a front side of the SHE layer is at the ABS, and the SHE layer stripe height is greater than the FL stripe height.

Referring to FIG. 9, an enlarged view of SHE layer 9 and FL 5 from FIG. 7A according to an alternative embodiment is depicted. If the stripe height of the SHE layer 9 is equal to that of the FL 5, the current $I_S$ split from j2 into the FL and sensor cannot be neglected. Assuming the FL has a width× SH1 of 24×24 $nm^2$ area for the j1 path, the SHE layer has a thickness×SH2 of 6×24 $nm^2$ for the j2 path, the current density from the left lead 94 into SHE layer side 9s1 is $j_{in}$ and the current density from side 9s2 to the right lead 95 is $j_{out}$, then total input current $I_{in}$ to the SHE layer equals the sum of output current split into the sensor ($I_S$) and the output current ($I_{out}$) into the right lead where $I_{out} \times j_{in} = j_{out} + 4 \times j1$ because j1 has a cross-sectional area in the (x, y) plane that is a factor of 4 higher than the cross-sectional area for j2 in the (x, z) plane, and $j2=(j_{in}+j_{out})/2=j_{in}+2 \times j1$, which is still in the applicable regime. Note that $I_{in}=1.25 \times I_S$ and $I_{out}=0.25 \times I_S$. The same result is realized for the alternative embodiments in FIG. 7B, FIG. 8A, and FIG. 8B where SH1 is essentially equal to SH2 (FIG. 12).

Figure 10A:
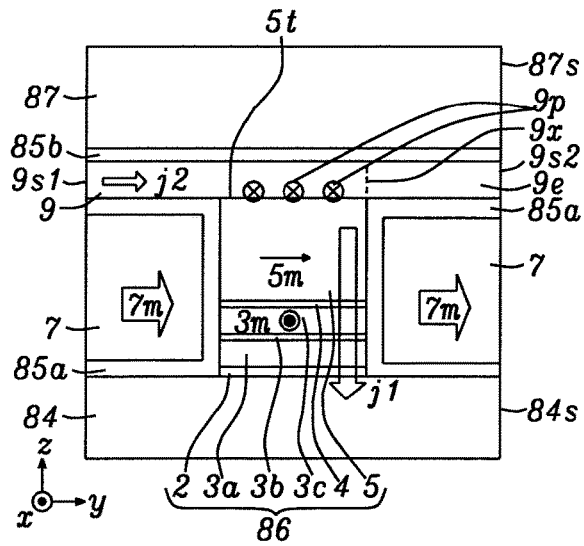
FIG. 10A and FIG. 10B are alternative embodiments to FIG. 7A and FIG. 7B, respectively, where the reader sensor is modified to a two terminal device by flowing a current j from one side of the (+) SHE layer to S1 or in the reverse direction when the other SHE layer side is removed or disconnected from a lead.

In FIG. 10A, another embodiment of the present disclosure is illustrated and is a modification of the reader in the first embodiment where the three terminal device becomes a two terminal device. In particular, for a SHE layer 9 made of a giant positive SHA material, and when the stripe height of the SHE layer is proximate to that of the FL, current through the SHE layer is substantially the same as the current through the MR sensor. In other words, current with current density j2 may be input from a first terminal (not shown) and through a lead to SHE layer side 9s1, and continues through sensor 86 with current density j1 to S1 84 that serves as a second terminal. A key feature is that a right portion 9e of the SHE layer between dashed line 9x and right side 9s2 is either not connected to an output lead as in the first embodiment, or is removed by etching and replaced with an insulation layer (not shown). In addition to the spin torque induced magnetic noise reduction in the FL associated with the three terminal embodiments described earlier, this embodiment has an additional advantage of simplifying the circuit and process steps. Note that the thickness and stripe height of the SHE layer may be adjusted so that product (j1×P0) is proximate or equal to product (j2×SHA) so that spin polarization 9p from the SHE layer opposes spin polarization (not shown) from AP1 layer 3c on FL 5 with the overall outcome of substantially reducing or essentially eliminating, respectively, spin torque induced magnetic noise in the FL.

Figure 10B:
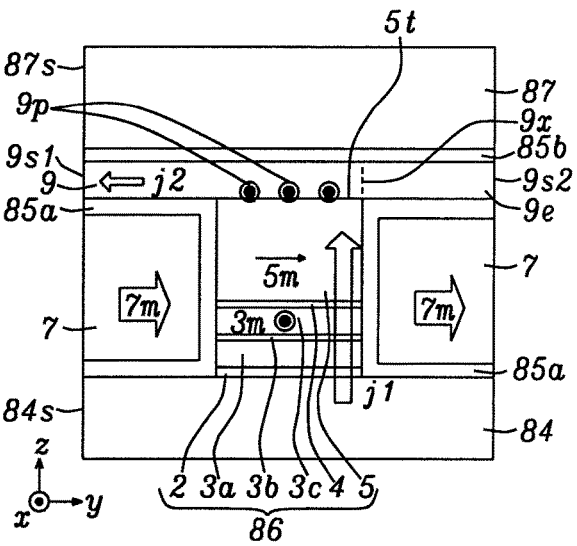

As shown in FIG. 10B, the reader configuration in FIG. 10A also encompasses an embodiment where current with current density j1 flows from S1 84 upward through sensor 86 and to the SHE layer 9, and then exits with current density j2 through SHE layer side 9s1 to a lead (not shown). In this case, SHE layer spin polarization 9p is in the opposite direction shown in FIG. 10A but still opposes spin polarization from AP1 layer 3c on FL 5 because the j1 pathway through the AP1 layer is also reversed compared with the FIG. 10A configuration. Therefore, the same advantageous result of reduced spin torque induced magnetic noise in the FL that enables a reduced SNR, lower tunnel barrier RA, and improved reader performance for MR sensor width w1<25 nm, is realized.

Figure 11A:
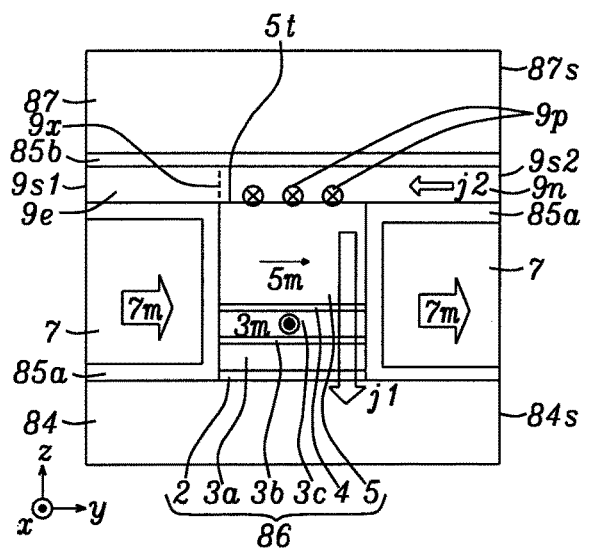
FIG. 11A and FIG. 11B are alternative embodiments to FIG. 8A and FIG. 8B, respectively, where the reader sensor is modified to a two terminal device by flowing a current from one side of the (-) SHE layer to S1 or in the reverse direction when the other SHE layer side is removed or disconnected from a lead.

Referring to FIG. 11A, all aspects of the embodiment in FIG. 10A are retained except the (+) SHE layer is replaced with a negative giant SHA material to give SHE layer 9n. Moreover, the left portion 9e of the SHE layer between dashed line 9x and side 9s1 is either not connected to an output lead as in the three terminal embodiment, or is removed with an etching process and replaced by an insulation layer (not shown). A key feature is that current with current density j2 in SHE layer 9n is reversed compared with FIG. 10A and flows from side 9s2 to a center portion of the SHE layer and then continues with current density j1 down through MR sensor 86 to S1 84 in order to achieve the same effect where spin torque produced by spin polarization 9p in the SHE layer essentially cancels spin torque caused by spin polarization from AP1 layer 3c that is generated on FL 5.

Figure 11B:
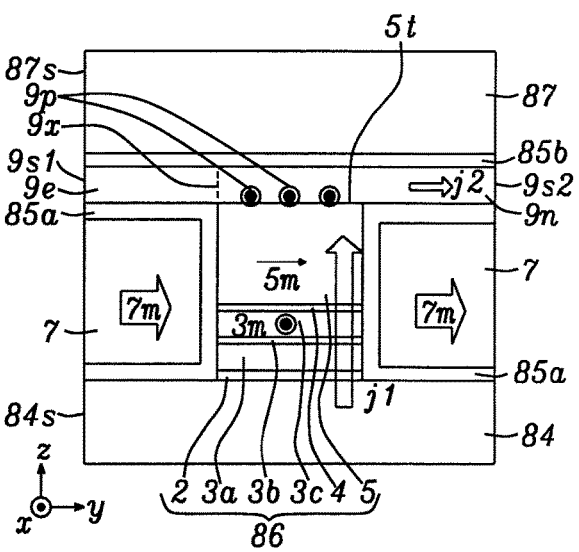

Alternatively in FIG. 11B, the reader configuration shown in FIG. 11A is retained except the current pathway is reversed so that current with current density j1 proceeds from S1 84 up through sensor 86, and then exits SHE layer 9n at side 9s2 with current density j2. Spin polarization 9p is in the opposite direction compared with the FIG. 11A embodiment, but spin torque from the SHE layer continues to oppose spin torque from AP1 layer 3c on FL 5 because the current pathway through the AP1 layer is also reversed.

In the two terminal device embodiments, an upper portion of FL 5 proximate to top surface 5t or an upper layer in a multilayer stack for the FL preferably has a higher resistivity than the lower portion of the FL, and preferably a resistivity that is at least ~5×10$^{-7}$ Ohm·m. If the resistivity in the upper portion of the FL is too low, then the spin torque generated by SHE layer 9 (or 9n) will be concentrated in the FL corner nearer to the spin current injection side, which is side 9s1 in FIG. 10A and side 9s2 in FIG. 11A, or in the FL corner nearer the spin current exit, which is side 9s1 in FIG. 10B and side 9s2 in FIG. 11B. Magnetic materials with B doping such as CoFeB, CoB, and FeB typically have higher resistivity than non-B containing materials, and are preferred for an upper portion of the FL proximate to the SHE layer since they also do not reduce the TMR ratio. In other embodiments, the upper FL portion may contain a high damping impurity that is one of Re, Tb, or the like that also provides higher resistivity as long as the impurity element does not diffuse into the tunnel barrier 4 and cause a reduction in the tunneling magnetoresistive (TMR) ratio.

As indicated earlier, the present disclosure anticipates that the MR sensor in any of the previously described reader configurations may have different locations for an AFM layer that is used to pin the AP2 layer 3a and thus stabilize the direction of magnetization 3m in AP1 layer 3c. In conventional reader designs where reader shield to shield spacing (RSS) at the ABS is not a critical concern, then an AFM layer (not shown) may be formed between the seed layer 2 and AP2 layer 3a in FIG. 1A, for example. However, in more recent designs where reducing RSS is an important requirement, then the AFM layer may be recessed behind one or more other layers in the MR sensor. In related U.S. Pat. No. 9,437,225, we disclosed a MR sensor structure where an AFM layer is formed behind the FL, and in related U.S. Pat. No. 9,799,357, we disclosed a MR sensor wherein the AFM layer is behind an upper portion of S1 in order to reduce RSS and pin related noise.

The present disclosure also encompasses reader designs with different stripe heights and positions for SHE layer 9 (or 9n). In the exemplary embodiment shown in FIG. 12 that is a down-track cross-sectional view of the reader structure in one of FIGS. 7A-8B or in one of FIGS. 10A-11B, the SHE layer has a front side 9f at the ABS 30-30, and a backside 9b at a stripe height SH2. FL 5 has stripe height SH1 between the ABS and backside 5e, and magnetization 5m in the absence of an external field. AP1 layer magnetization 3m is AF coupled to AP2 layer magnetization 3m1. The AFM layer that is typically employed to pin magnetization 3m1 is not pictured in this drawing since the MR sensor may accommodate various AFM layer positions such as in U.S. Pat. No. 9,799,357, for example. As explained previously, SH2 may be greater than SH1 in a reader with a three terminal device configuration in FIGS. 7A-8B. In other embodiments (FIGS. 10A-11B) where SH1 is proximate to SH2, the reader may have a two terminal device configuration where current with current density j2 flows from one side of the SHE layer in a longitudinal direction to a center portion thereof, and then with current density j1 in a down-track direction to S1, or in the reverse pathway mentioned previously.

Figure 13:
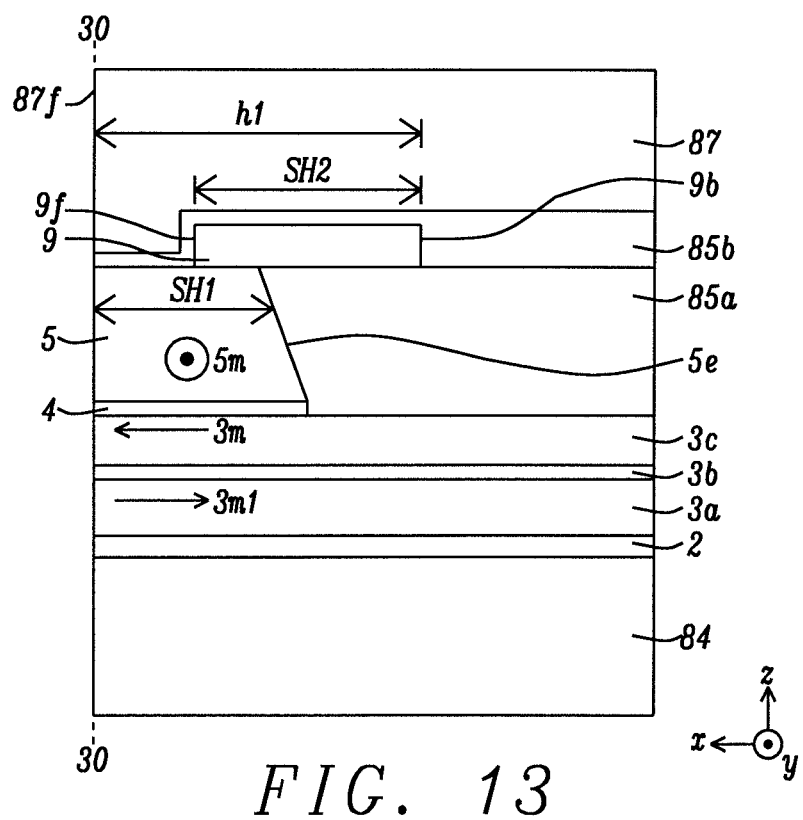
FIG. 13 is a down-track cross-sectional view of a reader sensor according to an embodiment of the present disclosure where the SHE layer is recessed behind a front portion of S2 in order to reduce reader shield to shield spacing (RSS).

Referring to FIG. 13, an alternative embodiment for the placement of SHE layer 9 is depicted. A key feature is that front side 9f is recessed behind a portion of S2 front side 87f to reduce RSS. The SHE layer has stripe height SH2, but a backside thereof is at height h1 from ABS 30-30 where h1>SH2. Insulation layer 85b continues to separate the SHE layer from S2 87.

Figure 14:
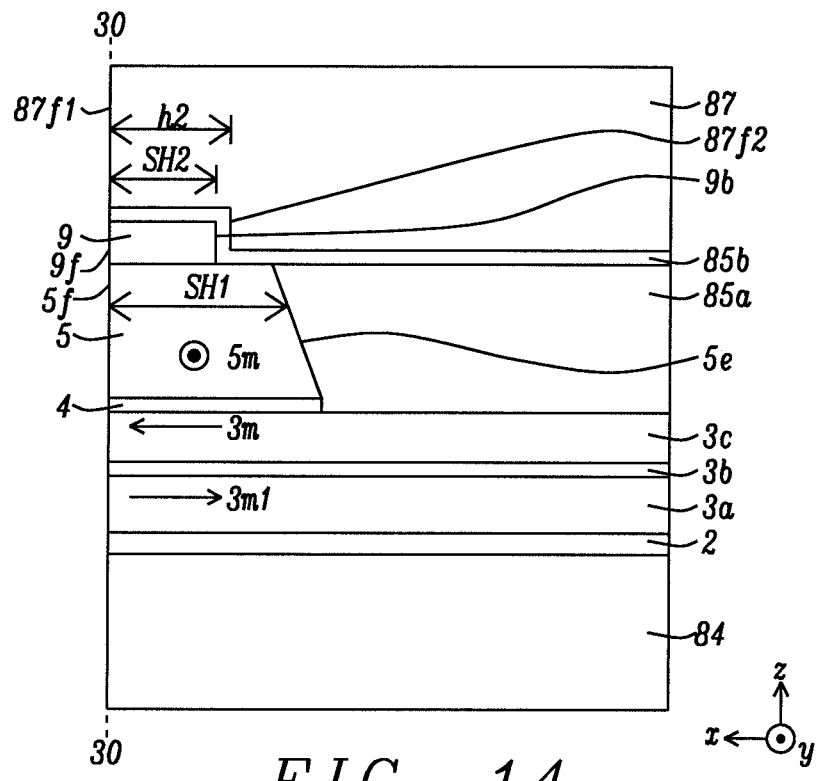
FIG. 14 is a down-track cross-sectional view of a reader sensor according to an embodiment of the present disclosure where a front side of the SHE layer is at the ABS, and the SHE layer is formed in front of S2 to reduce the RSS.

In yet another embodiment shown in FIG. 14, the SHE layer front side 9f may be maintained at ABS 30-30, but S2 87 has a lower portion with a front side 87f2 that is recessed behind SHE layer backside 9b in order to reduce RSS. Meanwhile, an S2 upper portion has front side 87f1 at the ABS. Here, SHE layer stripe height SH2 is less than FL stripe height SH1, and less than height h2 that is the recessed distance of S2 front side 87f2 from the ABS. FL 5 has a front side 5f at the ABS.

The present disclosure also encompasses a process sequence for fabricating a SHE layer 9 (or 9n) on a top surface 5t of FL 5 according to an embodiment described herein. The particular fabrication sequence that is illustrated relates to a reader with a MR sensor design with an ABS view in one of FIGS. 7A-8B, a down-track cross-sectional view shown in FIG. 12, and an AFM layer placement described in related U.S. Pat. No. 9,799,357. However, various combinations of a two terminal or three terminal device with one of multiple alternative AFM layer positions, and one of the SHE layer positions from FIGS. 12-14 are anticipated by the present disclosure as appreciated by those skilled in the art.

Figure 15:
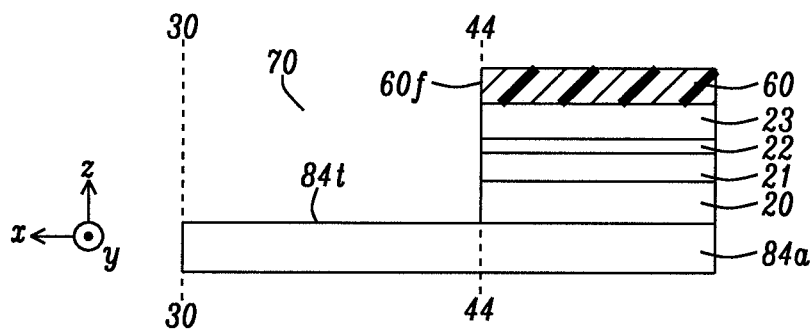
FIGS. 15-18 are down-track cross-sectional views showing a sequence of steps in forming a sensor wherein a seed layer, AP2 layer, AF coupling layer, AP1 layer, tunnel barrier, and FL are sequentially formed on S1, and an AFM layer is formed behind a portion of S1 according to an embodiment of the present disclosure.

Referring to FIG. 15, a down-track cross-sectional view is shown where a S2 bottom portion 84a with top surface 84t is provided. AFM layer 20, ferromagnetic (FM) layer 21, AF coupling layer 22, and FM layer 23 are sequentially laid down on the bottom shield. Optionally, FM layer 21 and the AF coupling layer 22 may be omitted so that the AFM layer pins a magnetization (not shown) in FM layer 23, which in turn is ferromagnetically coupled to AP2 layer 3a (shown in FIG. 17). Thus, the AFM layer is responsible for pinning a magnetization in the AP2 layer through a stack comprised of layers 21/22/23, or through a single FM layer 23.

A first photoresist layer 60 is coated on FM layer 23 and is patterned by a conventional photolithography method to form a front side 60f that faces the eventual ABS, which is indicated here by plane 30-30. Thereafter, a reactive ion etch (RIE) or ion beam etch (IBE) is performed to remove uncovered portions of underlying layers and stops on top surface 84t to leave an opening 70 between plane 30-30 and plane 44-44 that includes front side 60f.

Figure 16:
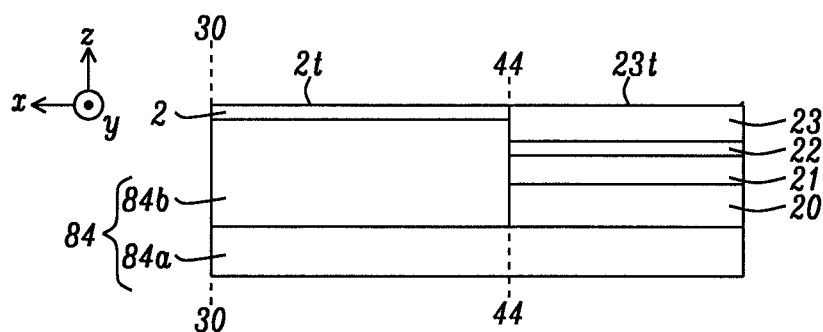

Referring to FIG. 16, S2 top portion 84b also known as a bottom shield refill and the seed layer 2 are sequentially deposited on S2 top surface 84t to a level that fills essentially all of opening 70 thereby forming a seed layer top surface 2t that is coplanar with top surface 23t on FM layer 23. The bottom shield refill is an extension of bottom shield 84a so that the bottom and top S2 portions may be collectively referred to as S2 84. A chemical mechanical polish (CMP) process may be performed to form coplanar top surfaces 2t and 23t.

Figure 17:
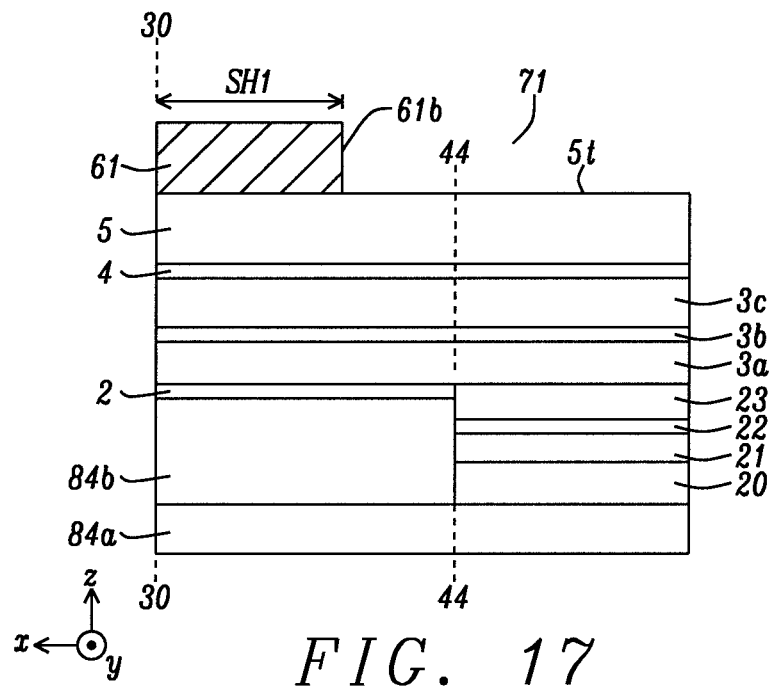

Referring to FIG. 17, AP2 layer 3a, AF coupling layer 3b, AP1 layer 3c, tunnel barrier 4, and FL 5 are sequentially laid down on seed layer 2 and FM layer 23. The aforementioned sensor layers may be deposited in an Anelva C-7100 thin film sputtering system or the like which typically includes three physical vapor deposition (PVD) chambers each having multiple targets, an oxidation chamber, and a sputter etching chamber. Next, a second photoresist layer 61 is coated on FL 5 and is patternwise exposed and developed with a photolithography process to generate a photoresist mask that extends from plane 30-30 to a backside 61b at stripe height SH1 from the eventual ABS. Opening 71 exposes a portion of FL top surface 5t. It should be understood that the ABS is not defined until a back end lapping process occurs after all layers in the read head and overlying write head are formed in combined read/write head structure. For the purpose of more clearly describing the process flow in this disclosure, the eventual ABS is illustrated as a reference plane 30-30. Thus, all layers contacting plane 30-30 actually extend to the opposite side of the eventual ABS until the lapping process is performed.

Figure 18:
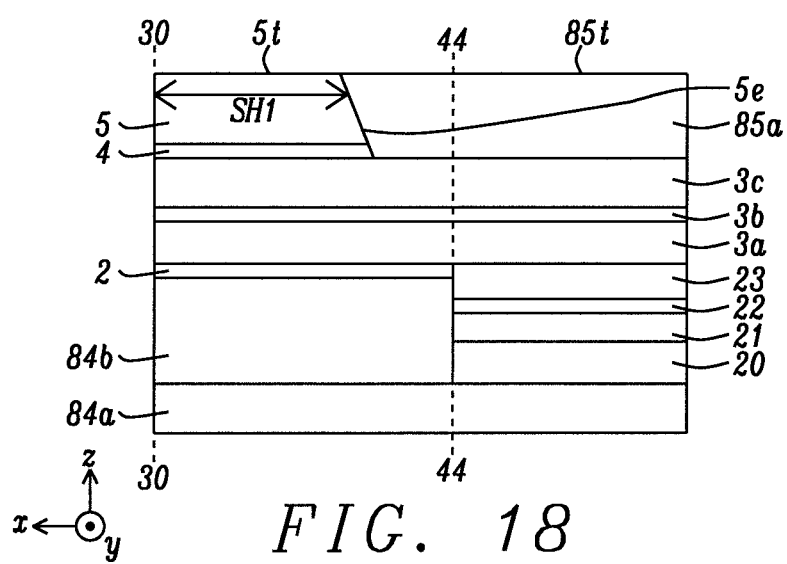

Referring to FIG. 18, patterned photoresist layer 61 is used as an etch mask during a RIE or IBE step that removes portions of the FL 5, and tunnel barrier 4 that are not protected by the etch mask. The etching process stops on a back portion of AP1 layer top surface 3t behind FL backside 5e where a bottom end at tunnel barrier 4 may be a greater distance from plane 30-30 than a top end at top surface 5t. Note that the FL backside may be essentially vertical in other embodiments depending on FL thickness and the etching conditions. Then, insulation layer 85a is deposited with a top surface 85t thereon. A planarization step may be performed to form a top surface 85t that is coplanar with FL top surface 5t. Insulation layer 85a is preferably one or more of $Al_2O_3$, TaOx, SiN, AlN, $SiO_2$, MgO, and NiO although other dielectric materials known in the art may be employed.

Figure 19:
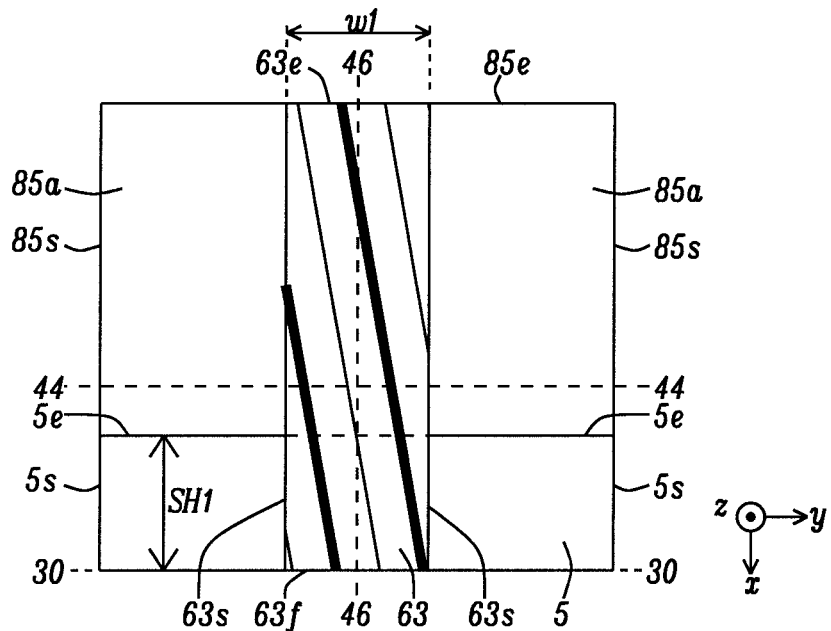
FIG. 19 is a top-down view showing a step of patterning the sensor stack of layers in a cross-track direction.

With regard to FIG. 19, a photoresist layer 63 is coated on FL 5 and insulation layer 85a with backside 85e, and is patternwise exposed and developed with a conventional photolithography process to form a photoresist mask having width w1 between sides 63s that extend from a front side 63f at the plane 30-30 to backside 63e. Portions of FL 5 are exposed on either side of center plane 46-46 between a side 63s and a far side of the MR sensor structure at FL side 5s. Portions of insulation layer 85a are exposed between each photoresist mask side 63s and a far side 85s of the insulation layer, and behind FL backside 5e.

Figure 20:
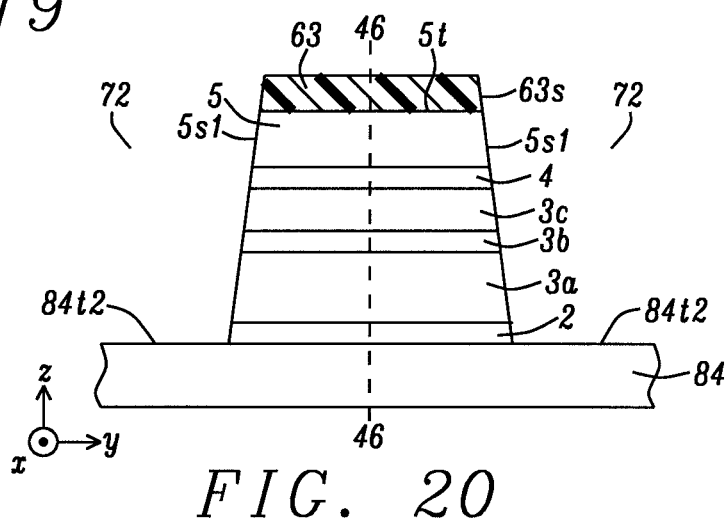
FIGS. 20-21 are views from the eventual ABS plane that show a sequence of etching a sensor stack to form sensor sidewalls, and then forming biasing layers on each side of the sensor according to an embodiment of the present disclosure.

FIG. 20 depicts a view of the partially formed MR sensor structure from plane 30-30 after exposed portions of the sensor stack between each photoresist mask side 63s and FL side 5s in FIG. 19 are removed by an IBE process thereby forming a MR sensor side 5s1 that extends from FL top surface 5t to S1 refill top surface 84t2 on each side of center plane 46-46. An opening 72 is generated on each side of the MR sensor. Insulation layer 85a has a composition that provides a slower etching rate than the sensor stack of layers to prevent etching into AP1 layer 3c behind plane 44-44 in FIG. 19.

Figure 21:
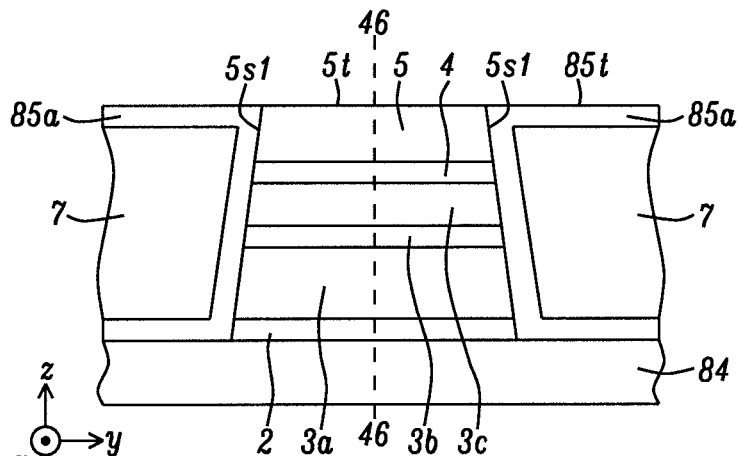

Referring to FIG. 21, the MR sensor structure in FIG. 20 is depicted after a second portion of insulation layer 85a and biasing layer 7 are deposited on S1 top surface 84t2 and on sidewall 5s1 to fill the opening 72. A planarization process may be used to form top surface 5t1 that is coplanar with insulation layer top surface 85t. Thus, each biasing layer 7 extends from the plane 30-30 to a backside at plane 44-44 (not shown).

Figure 22:
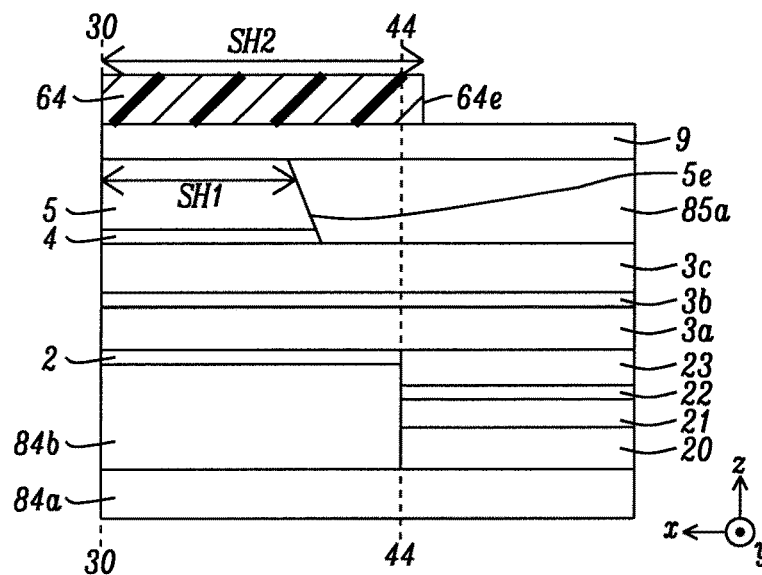
FIG. 22 and FIG. 23 are a down-track cross-sectional view and a top-down view, respectively, showing a step of patterning the SHE layer in a height direction.

In FIG. 22, SHE layer 9 (or 9n) is deposited on FL 5 and on insulation layer 85a. Then, another photoresist is coated on the SHE layer and patterned with a conventional method to yield photoresist mask 64 that extends a stripe height SH2 from plane 30-30 to a photoresist mask backside 64e.

Figure 23:
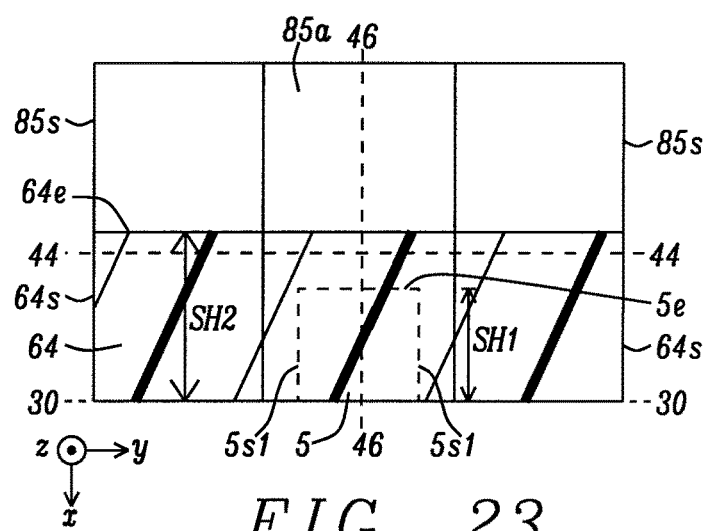

As shown from a top-down view in FIG. 23, unprotected portions of the SHE layer are removed with an IBE or RIE step behind photoresist mask backside 64e. The photoresist mask has outer sides 64s. The etch stops on or within insulation layer 85a and thereby forms SHE layer backside 9b.

Figure 24:
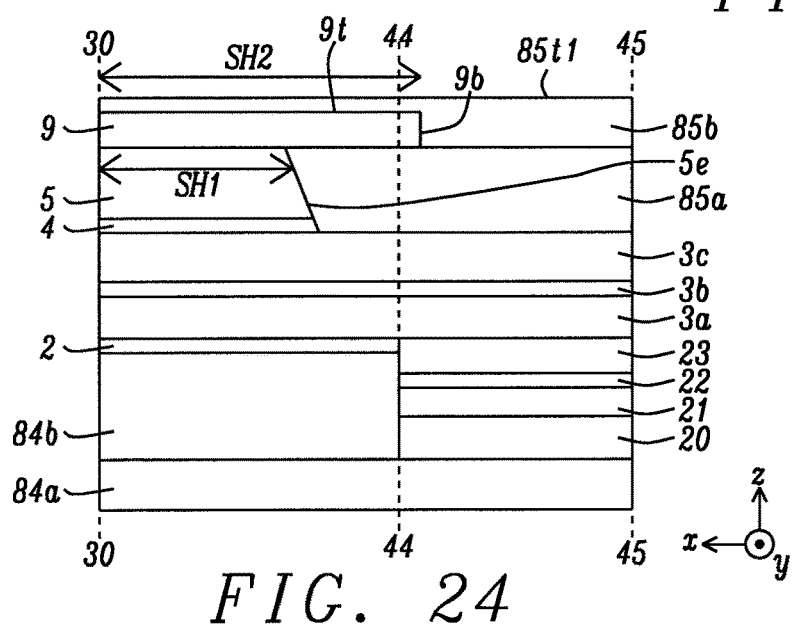
FIG. 24 is a down-track cross-sectional view of the sensor structure in FIG. 22 after an insulation layer is deposited behind the patterned SHE layer.

Referring to FIG. 24, after photoresist mask 64 is removed, insulation layer 85b with top surface 85t1 is deposited on SHE layer top surface 9t and on insulation layer 85a. Thereafter, another photoresist patterning and etch sequence well known to those skilled in the art may be performed to generate a backside on the MR sensor stack of layers at plane 45-45.

The present disclosure also encompasses an annealing step after all layers in the MR sensor structure have been deposited. A first annealing process may be performed to set the magnetization direction of the AP1 layer 3c and AP2 layer 3a by heating the patterned MR sensor to a temperature range of 200° C. to 350° C. while applying a magnetic field along the x-axis direction. A second annealing process is typically used to set the direction of magnetization 7m in biasing layers 7. If the temperature and/or applied field employed during the anneal of biasing layers 7 is lower than during annealing of the sensor stack, the first annealing process may be performed before the second annealing process to maintain the AP1 and AP2 magnetization directions established during the first annealing process.

While the present disclosure has been particularly shown and described with reference to, the preferred embodiments thereof, it will be understood by those skilled in the art that various changes in form and details may be made without departing from the spirit and scope of this disclosure.

We claim:

1. A read head, comprising:
(a) a bottom shield (S1) having a front side at an air bearing surface (ABS), and a top surface;
(b) a top shield (S2) having a front side at the ABS, and a bottom surface;
(c) a magnetoresistive (MR) sensor formed on S1 at the ABS, comprising:
   (1) a free layer (FL) with a magnetization in a first cross-track (longitudinal) direction, a front side at the ABS, and a back side at a first stripe height (SH1) from the ABS;
   (2) an AP1 reference layer with a magnetization that is orthogonal to the ABS in a first transverse direction, and wherein the AP1 reference layer is antiferromagnetically (AF) coupled to an AP2 reference layer through an AF coupling layer; and
   (3) a non-magnetic layer between the FL and AP1 reference layer; and
(d) a Spin Hall Effect (SHE) layer comprised of a negative Spin Hall Angle (SHA) material and formed on the FL and with a second stripe height (SH2) between a front side and backside thereof, and wherein a top surface of the SHE layer is separated from the S2 bottom surface by an insulation layer, and wherein the SHE layer is configured to spin polarize a current and generate a first spin torque on the FL that opposes a second spin torque generated by the AP1 reference layer on the FL when the current flows from a second side of the SHE layer to a first side of the SHE layer opposite to the first cross-track direction and a portion of the current flows through the MR sensor from the SHE layer to the S1, or when the current flows from the first side of the SHE layer to the second side of the SHE layer in the first cross-track direction and a portion of the current flows through the MR sensor from the S1 to the SHE layer thereby reducing spin torque induced magnetic noise in the FL.

2. The read head of claim 1 wherein the SHE layer has a down-track thickness less than 12 nm.

3. The read head of claim 1 wherein the SHE layer has an absolute value for SHA that is >0.05.

4. The read head of claim 1 wherein the SHE layer front side is at the ABS.

5. The read head of claim 4 wherein the SHE layer backside is formed between the ABS and a bottom portion of S2 that has a front side at height h2 from the ABS where h2>SH2.

6. The read head of claim 1 wherein the SHE layer front side is recessed behind a bottom portion of S2.

7. The read head of claim 1 wherein the non-magnetic layer is a tunnel barrier layer.

8. The read head of claim 1 wherein the MR sensor is further comprised of an antiferromagnetic (AFM) layer that is formed behind an upper portion of S1, and wherein the AFM layer pins a magnetization in the AP2 reference layer.

9. The read head of claim 1 wherein SH2 is greater than SH1.

10. A head gimbal assembly (HGA), comprising:
(a) the read head of claim 1; and
(b) a suspension that elastically supports the read head, wherein the suspension has a flexure to which the read head is joined, a load beam with one end connected to the flexure, and a base plate connected to the other end of the load beam.

11. A magnetic recording apparatus, comprising:
(a) the HGA of claim 10;
(b) a magnetic recording medium positioned opposite to a slider on which the read head is formed;
(c) a spindle motor that rotates and drives the magnetic recording medium; and
(d) a device that supports the slider, and that positions the slider relative to the magnetic recording medium.

* * * * *